(12) United States Patent
Bak

(10) Patent No.: US 6,996,814 B2
(45) Date of Patent: Feb. 7, 2006

(54) METHOD AND APPARATUS FOR DYNAMICALLY COMPILING BYTE CODES INTO NATIVE CODE

(75) Inventor: Lars Bak, Tranbjerg J (DK)

(73) Assignee: SUN Microsystems, Inc., Santa Clara, CA (US)

( * ) Notice: Subject to any disclaimer, the term of this patent is extended or adjusted under 35 U.S.C. 154(b) by 107 days.

(21) Appl. No.: 10/122,027

(22) Filed: Apr. 12, 2002

(65) Prior Publication Data

US 2003/0093779 A1 May 15, 2003

Related U.S. Application Data

(60) Provisional application No. 60/332,925, filed on Nov. 14, 2001.

(51) Int. Cl.
G06F 9/45 (2006.01)

(52) U.S. Cl. .................. 717/148; 717/118; 717/151

(58) Field of Classification Search ........ 717/140–153, 717/118, 127
See application file for complete search history.

(56) References Cited

U.S. PATENT DOCUMENTS

| | | | | |
|---|---|---|---|---|
| 5,933,635 | A | 8/1999 | Holzle et al. ............ | 395/701 |
| 6,295,642 | B1 * | 9/2001 | Blandy ................. | 717/148 |
| 6,321,375 | B1 * | 11/2001 | Blandy ................. | 717/127 |
| 6,546,550 | B1 * | 4/2003 | Ogata et al. ........... | 717/148 |
| 6,735,761 | B1 * | 5/2004 | Ogasawara ............. | 717/140 |
| 6,901,587 | B2 * | 5/2005 | Kramskoy et al. ....... | 717/154 |

FOREIGN PATENT DOCUMENTS

EP 0908818 A2 9/1998

OTHER PUBLICATIONS

Kowalkowshi, "HiDeos Services Reference manual", Apr. 12, 1995, pp 1-2.*

Cramer, T. et al., "Compiling Java Just in Time" IEEE Micro. IEE Inc. New York, US, vol. 17, No. 3, May 1, 1997, pp. 36-43, XP000656035, ISSN: 0272-1732, p. 37, col. 1, line 3-p. 37, col. 2, line 2.

Krintz C J et al: "Reducing the Overhead of Dynamic Compilation" Software Practice & Experience, John Wiley & Sons LTD. Chichester, GB, vol. 31, No. 8, Jul. 10, 2001, pp. 717-738, XP001065393, ISSN: 0038-0644, abstract, p. 719 line 13, p. 720 line 5, p. 721 line 15, p. 722 line 22, p. 728 line 1, p. 729 line 3, p. 729 line 4, p. 729 line 18, p. 733 line 22, p. 734 line 24.

Plezbert MP et al: "Does Just in Time = Better Late Than Never?" Conference Record of Popl '97: 24th. ACM Sigplan-Sigact Symposium on Principals of Programming Language. Paris, Jan. 15-17, 1997, Conference Record of Popl: ACM Sigplan-Sigact Symposium on Principles of Programming Language, New York, ACM, US, vol. Conf. 28, Jan. 15, 1997, pp. 120-131, XP000741815, ISBN: 0-89791-853-3, abstract p. 120 col. 2 line 1, p. 121 col. 1 line 32, p. 122 col. 2 line 13, p. 126 col. 1 line 20.

* cited by examiner

*Primary Examiner*—Kakali Chaki
*Assistant Examiner*—Lawrence Shrader
(74) *Attorney, Agent, or Firm*—Park, Vaughan & Fleming LLP

(57) ABSTRACT

One embodiment of the present invention provides a system that dynamically compiles byte codes into native code to facilitate faster execution. This method operates in a mixed-mode system that supports execution of both compiled code and interpreter code. During operation, the system periodically determines if a currently executing thread is executing through the interpreter. If so, the system locates the method being executed by the thread and compiles the byte codes of the method into native code. Subsequent executions of the method utilize the faster-executing native code.

15 Claims, 2 Drawing Sheets

METHOD AND APPARATUS FOR DYNAMICALLY COMPILING BYTE CODES INTO NATIVE CODE

RELATED APPLICATION

This application hereby claims priority under 35 U.S.C. §119 to U.S. Provisional Patent Application No. 60/332,925, filed on Nov. 14, 2001, entitled "Improving Performance In Virtual Machines," by inventors Lars Bak, Jacob R. Andersen, Kasper V. Lund and Steffen Grarup.

BACKGROUND

1. Field of the Invention

The present invention relates to compilers for computer systems. More specifically, the present invention relates to a method and an apparatus that dynamically compiles byte codes into native code to facilitate faster program execution.

2. Related Art

The exponential growth of the Internet has in part been fueled by the development of computer languages, such as the JAVA™ programming language distributed by Sun Microsystems, Inc. of Palo Alto, Calif. The JAVA programming language allows an application to be compiled into a module containing platform-independent byte codes, which can be distributed across a network of many different computer systems. Any computer system possessing a corresponding platform-independent virtual machine, such as the JAVA virtual machine, is then able to execute the byte codes. In this way, a single form of the application can be easily distributed to and executed by a large number of different computing platforms.

When an application is received in platform-independent form, it can be interpreted directly through an interpreter, or alternatively, it can be compiled into machine code for the native architecture of the computing platform. Machine code executes significantly faster than interpreter code. However, compiled code occupies considerably more space than interpreter code. Hence, the determination of whether or not to compile interpreter code depends on the relative importance of memory space to execution speed.

Some "mixed-mode" computer systems support execution of both compiled code and interpreter code. Determining which methods to compile and which to leave to be executed by the interpreter can be a difficult problem. This is especially true for constrained memory systems, such as pocket-sized computing devices, which have limited memory space to accommodate compiled methods, and which typically do not provide swap space in secondary storage for the virtual memory system. This is not as much of a problem in larger computer systems, which have more memory to store compiled methods, and which can rely on the virtual memory system to migrate unused compiled methods to swap space in secondary storage.

In many cases, statistical information gained through special profiling sessions can be used to determine which methods to compile. However, systems that compile methods based on profiling information operate on assumptions that might not hold true from situation to situation. In some situations a method might be invoked numerous times, and in other situations, such as during profiling, it might not be invoked at all. In addition, profiling requires the methods to be executed to gather statistical information, which requires additional time. Furthermore, profiling code takes up valuable space.

Another possible method for determining which methods to compile is to use invocation counters. Each method can have its own invocation counter that is incremented each time the method is executed. A method is compiled when its corresponding invocation counter exceeds a predetermined value. However, this technique has drawbacks: the invocation counters take up space; infrequently used methods will eventually be compiled; and executing a method in interpreted mode until the invocation counter reaches the predetermined value can consume a significant amount of computational time.

Hence, what is needed is a method and an apparatus for dynamically compiling byte codes into native code without the problems of the above-described techniques.

SUMMARY

One embodiment of the present invention provides a system that dynamically compiles byte codes into native code to facilitate faster execution. This method operates in a mixed-mode system that supports execution of both compiled code and interpreter code. During operation, the system periodically determines if a currently executing thread is executing through the interpreter. If so, the system locates the method being executed by the thread and compiles the byte codes of the method into native code. Subsequent executions of the method utilize the faster-executing native code.

In a variation on this embodiment, the currently executing thread is halted while the compilation process takes place. Upon completion of the compilation process, execution of the thread is resumed.

In a further variation, when execution of the thread is resumed, it is resumed in the interpreter utilizing the byte codes.

In a further variation, when execution of the thread is resumed, it is resumed utilizing the compiled native code rather than through the interpreter utilizing the byte codes.

In yet a further variation, when execution of the thread is resumed utilizing the compiled native code, the system replaces an activation record on the stack with a compiled version of the activation record.

In a variation on this embodiment, the system determines if a currently executing thread is executing in the interpreter when it receives an interrupt.

In a further variation, the interrupt is received from a tick timer that periodically generates interrupts for an operating system.

In a variation on this embodiment, the system periodically de-optimizes the code by removing the native code for selected methods in order to free up memory space. This causes subsequent executions of the methods to execute the byte codes in interpreted mode.

In a variation on this embodiment, the system utilizes compiler throttling. During compiler throttling, the system skips opportunities to compile byte codes into native code if certain thresholds have been exceeded. These thresholds can include: exceeding the amount of processor time allotted to the compiler; exceeding the memory allowance of the compiler; or exceeding a memory storage quota.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Device

Figure 1:
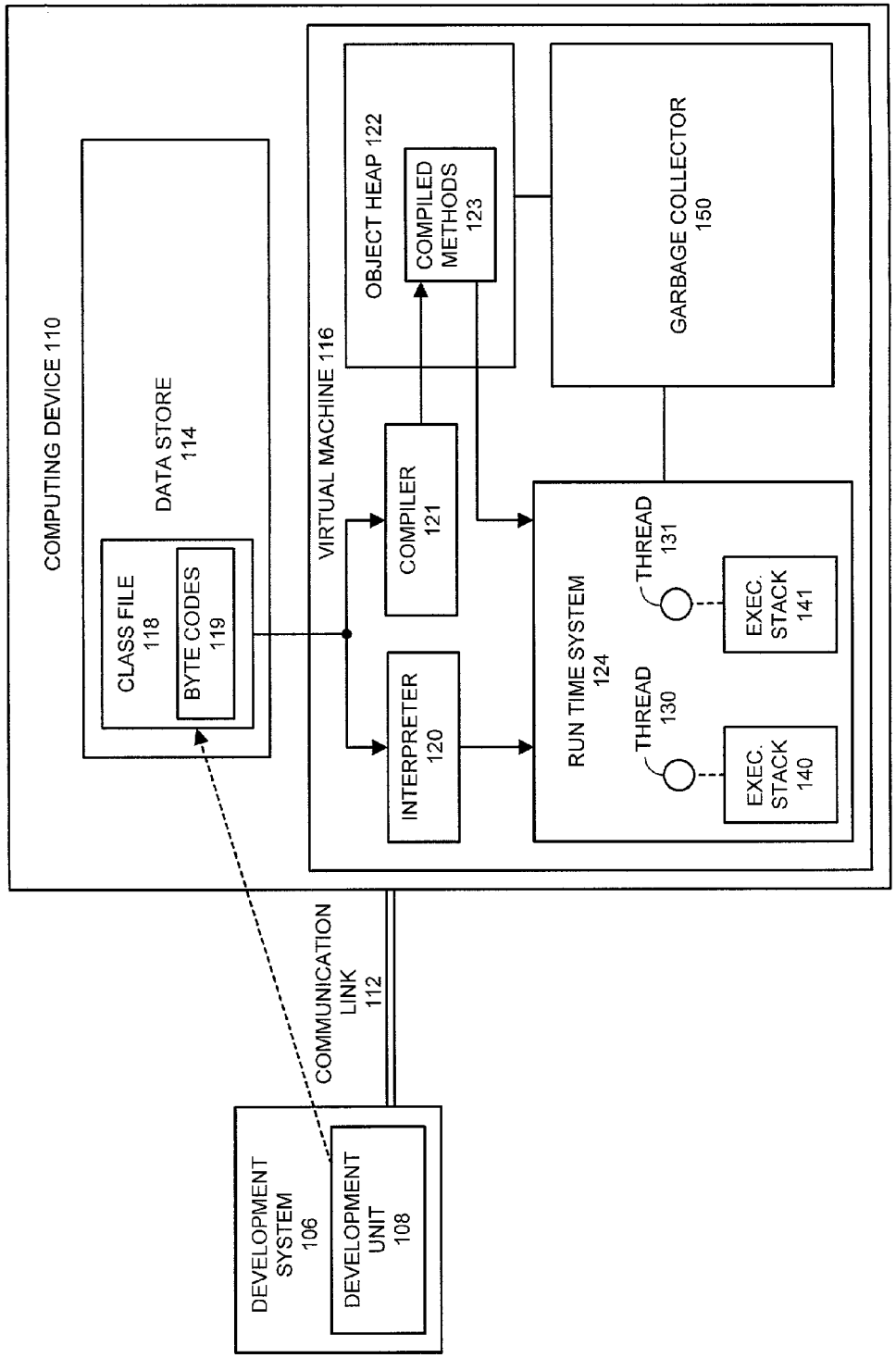
FIG. 1 illustrates a computing device in accordance with an embodiment of the present invention.

FIG. 1 illustrates a computing device 110 coupled to a development system 106 in accordance with an embodiment of the present invention. Development system 106 can generally include any type of computer system, including, but not limited to, a computer system based on a microprocessor, a mainframe computer, a digital signal processor, a portable computing device, a personal organizer, a device controller, or a computational engine within an appliance. Development system 106 contains development unit 108, which includes programming tools for developing platform-independent applications. This generally involves compiling an application from source code form into a platform-independent form, such as JAVA byte codes.

Development system 106 is coupled to computing device 110 through a communication link 112. Computing device 110 can include any type of computing device or system including, but not limited to, a mainframe computer system, a server computer system, a personal computer system, a workstation, a laptop computer system, a pocket-sized computer system, a personal organizer or a device controller. Computing device 110 can also include a computing device that is embedded within another device, such as a pager, a cellular telephone, a television, an automobile, or an appliance.

Communication link 112 can include any type of permanent or temporary communication channel that may be used to transfer data from development system 106 to computing device 110. This can include, but is not limited to, a computer network such as an Ethernet, a wireless communication link or a telephone line.

Computing device 110 includes data store 114, for storing code and data. Computing device 110 also includes virtual machine 116 for processing platform-independent applications retrieved from data store 114.

During the development process, a class file 118 is created within development unit 108. Class file 118 contains components of a platform-independent application to be executed in computing device 110. For example, class file 118 may include methods and fields associated with an object-oriented class. Note that these methods are specified using platform-independent byte codes 119.

Next, class file 118 is transferred from development unit 108, through communication link 112, into data store 114 within computing device 110. This allows virtual machine 116 to execute an application that makes use of components within class file 118. Note that virtual machine 116 can generally include any type of virtual machine that is capable of executing platform-independent code, such as the JAVA VIRTUAL MACHINE™ developed by SUN Microsystems, Inc. of Palo Alto Calif. (Sun, Sun Microsystems, Java and Java Virtual Machine are trademarks or registered trademarks of Sun Microsystems, Inc. in the United States and other countries.)

Virtual machine 116 includes object heap 122 for storing objects that are manipulated by code executing on virtual machine 116. Object heap 122 also stores compiled methods 123.

Virtual machine 116 also includes an interpreter 120, which interprets platform-independent byte codes 119 retrieved from data store 114 to facilitate program execution. During operation, interpreter 120 generally translates one byte code at a time as byte codes 119 are continuously read into interpreter 120.

Alternatively, virtual machine can use compiler 121 to compile methods from byte code form into machine code form to produce compiled methods 123, which are stored in object heap 122.

Note that a compiled method, along with information from an associated activation record, can be used to restore an interpreter code equivalent of the compiled method. Alternatively, the interpreter code equivalent of the compiled method can be retrieved again from data store 114. Thus, the interpreter code equivalent of a compiled method may generally be obtained at any time.

Virtual machine 116 includes a runtime system 124. Runtime system 124 maintains state information for threads 130–131. This state information includes execution stacks 140–141, respectively. Execution stacks 140–141 store activation records for methods being executed by threads 130–131, respectively.

Runtime system 124 can either execute code that is received from interpreter 120, or compiled methods 123 received from object heap 122. When a method is invoked by virtual machine 116, the system first determines if the method is to be invoked as an interpreted method. If so, runtime system 124 obtains the method from interpreter 120.

If, on the other hand, the system determines that the method is to be invoked as a compiled method, runtime system 124 activates compiler 121, which generates machine code instructions from the byte codes. These machine code instructions are subsequently executed by runtime system 124.

Virtual machine also includes garbage collector 150, which periodically reclaims unused storage from object heap 122. Note that garbage collector 150 may also remove complied methods to reclaim storage.

Process of a System that Dynamically Compiles Methods

Figure 2:
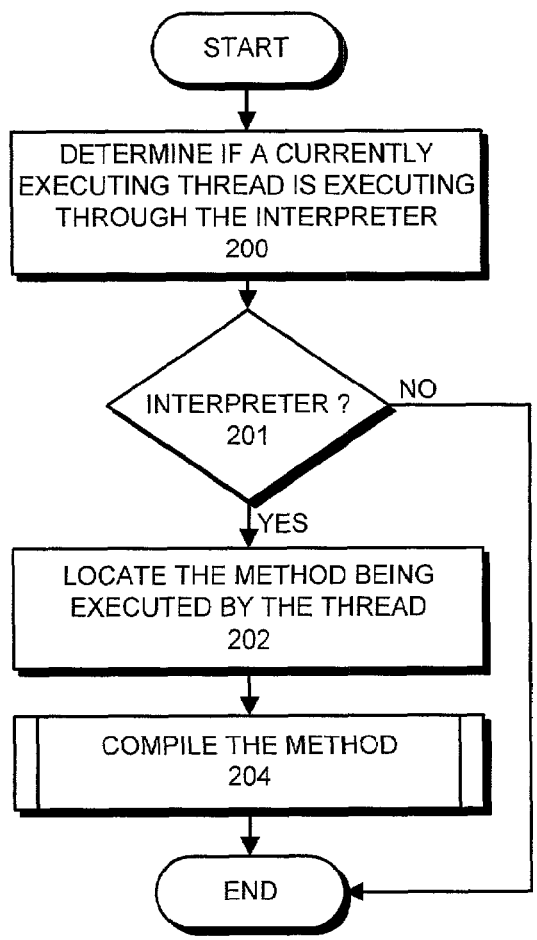
FIG. 2 is a flowchart illustrating the operation of a system that dynamically compiles methods in accordance with an embodiment of the present invention.

FIG. 2 is a flowchart illustrating the operation of a system that dynamically compiles methods in accordance with an embodiment of the present invention. The system starts by determining if a currently executing thread is executing through interpreter 120 (step 200). This process can be triggered by an interrupt or from a tick timer, or can occur at some predetermined moment. If the currently executing thread is executing through interpreter 120, the system locates the method that is being executed by the thread (step 202). Finally, the system compiles the method into native code so that subsequent executions utilize the compiled method (step 204).

Process of Compiling a Method

Figure 3:
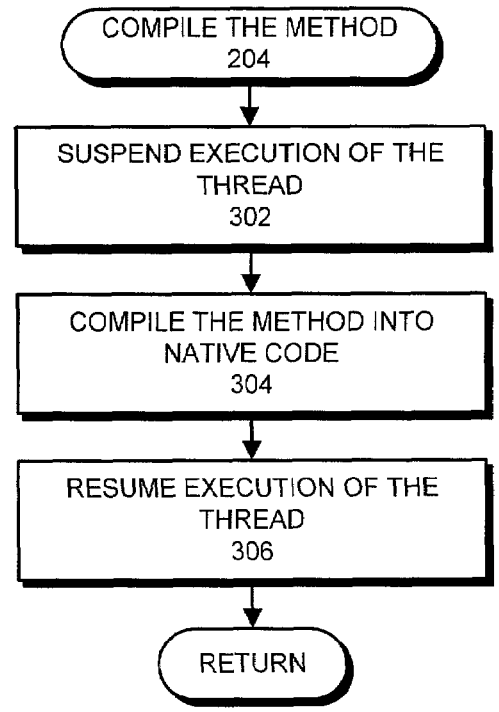
FIG. 3 is a flowchart illustrating the process of compiling a method in accordance with an embodiment of the present invention.

FIG. 3 is a flowchart illustrating the process of compiling a method in accordance with an embodiment of the present invention. The system starts by suspending the executing thread (step 302). Note that this step is not necessary in all circumstances. It might be beneficial in some instances to compile the method for future executions without suspending the current execution.

Next, the system compiles the byte codes of the method into native code (step 304).

Finally, the system resumes execution of the thread (step 306). When resuming execution of the thread, the system has several options. One option is for the system to resume execution of the thread through the interpreter at the point where it was suspended. Subsequent invocations of the method will then use the native code version of the method.

A second option is to resume execution of the thread using the native code that was just compiled. In this case, the activation record on the stack may have to be replaced with the compiled version of the activation. The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for dynamically compiling byte codes into native code to facilitate faster execution, comprising:
   periodically determining if a currently executing thread is executing through the interpreter, wherein periodically determining if the currently executing thread is executing through the interpreter involves examining the currently executing thread after receiving an interrupt, wherein the interrupt is received from a tick timer that periodically generates interrupts for an operating system, and if so:
      locating a method currently being executed by the thread, and
      compiling byte codes of the method into native code so that subsequent executions of the method execute native code;
   periodically removing unused native code for methods in order to:
      a) free up memory space, thereby reclaiming memory space to be reused for subsequently compiled methods, and
      b) cause subsequent executions of the methods whose native code has been removed to revert to executing byte codes in interpreted mode; and
   continue executing through the interpreter without compiling byte codes into native codes if a predetermined threshold for a compiler used to compile the byte codes of the method is met, wherein conditions for meeting the predetermined threshold comprise:
      the compiler exceeding a processor time allowance,
      the compiler exceeding a memory usage allowance, or
      the compiler exceeding a memory storage quota.

2. The method of claim 1, further comprising suspending execution of the thread prior to compiling the method, and resuming execution of the thread after the method has compiled.

3. The method of claim 2, wherein resuming execution of the thread involves resuming execution of the method in interpreted mode utilizing byte codes.

4. The method of claim 2, wherein resuming execution of the thread involves resuming execution of the method utilizing native code rather than in interpreted mode utilizing byte codes.

5. The method of claim 4, wherein resuming execution of the thread utilizing native code involves replacing an activation record on the process stack with a compiled version of the activation record.

6. A computer-readable storage medium storing instructions that when executed by a computer cause the computer to perform a method for dynamically compiling byte codes into native code to facilitate faster execution, comprising:
   periodically determining if a currently executing thread is executing through the interpreter, wherein periodically determining if the currently executing thread is executing through the interpreter involves examining the currently executing thread after receiving an interrupt, wherein the interrupt is received from a tick timer that periodically generates interrupts for an operating system, and if so:
      locating a method currently being executed by the thread, and
      compiling byte codes of the method into native code so that subsequent execution of the method execute native code;
   periodically removing unused native code for methods in order to:
      a) free up memory space, thereby reclaiming memory space to be reused for subsequently compiled methods, and
      b) cause subsequent executions of the methods whose native code has been removed to revert to executing byte codes in interpreted mode; and
   continue executing through the interpreter without compiling byte codes into native codes if a predetermined threshold for a compiler used to compile the byte codes of the method is met, wherein conditions for meeting the predetermined threshold comprise.
      the compiler exceeding a processor time allowance,
      the compiler exceeding a memory usage allowance, or
      the compiler exceeding a memory storage quota.

7. The computer-readable storage medium of claim 6, further comprising suspending execution of the thread prior to compiling the method, and resuming execution of the thread after the method has compiled.

8. The computer-readable storage medium of claim 7, wherein resuming execution of the thread involves resuming execution of the method in interpreted mode utilizing byte codes.

9. The computer-readable storage medium of claim 7, wherein resuming execution of the thread involves resuming execution of the method utilizing native code rather than in interpreted mode utilizing byte codes.

10. The computer-readable storage medium of claim 9, wherein resuming execution of the thread utilizing native code involves replacing an activation record on the process stack with a compiled version of the activation record.

11. An apparatus that dynamically compiles byte codes into native code to facilitate faster execution, comprising:
  a determining mechanism configured to periodically determine if a currently executing thread is executing through the interpreter, wherein periodically determining if the currently executing thread is executing through the interpreter involves examining the currently executing thread after receiving an interrupt, wherein the interrupt is received from a tick timer that periodically generates interrupts for an operating system;
  a dynamic compilation mechanism that is configured to, locate a method currently being executed by the thread, and
    to compile byte codes of the method into native code so that subsequent executions of the method execute native code; and
  a garbage collection mechanism that is configured to periodically:
    a) remove unused native code for methods in order to free up memory space, thereby reclaiming memory space to be reused for subsequently compiled methods, and
    b) cause subsequent executions of the methods whose native code has been removed to revert to executing byte codes in interpreted mode;
  wherein the compiling mechanism is configured to skip the opportunity to compile the method into native code if a predetermined threshold for the compiling mechanism is met, wherein conditions meeting the predetermined threshold are:
    the compiling mechanism exceeding a processor time allowance,
    the compiling mechanism exceeding a memory usage allowance, or
    the compiling mechanism exceeding a memory storage quota.

12. The apparatus of claim 11, further comprising a control mechanism configured to suspend execution of the thread prior to compiling the method, and to resume execution of the thread after the method has compiled.

13. The apparatus of claim 12, wherein the control mechanism is configured to resume execution of the thread by resuming execution of the method in interpreted mode utilizing byte codes.

14. The apparatus of claim 12, wherein the control mechanism is configured to resume execution of the thread by resuming execution of the method utilizing native code rather than in interpreted mode utilizing byte codes.

15. The apparatus of claim 14, wherein while resuming execution of the thread, the control mechanism is configured to utilize native code by replacing an activation record on the process stack with a compiled version of the activation record.

* * * * *

UNITED STATES PATENT AND TRADEMARK OFFICE
CERTIFICATE OF CORRECTION

PATENT NO. : 6,996,814 B2
DATED : February 7, 2006
INVENTOR(S) : Lars Bak

It is certified that error appears in the above-identified patent and that said Letters Patent is hereby corrected as shown below:

Column 6,
Line 39, delete "execution" and replace with -- executions --.

Signed and Sealed this

Eleventh Day of April, 2006

JON W. DUDAS
*Director of the United States Patent and Trademark Office*